US010273836B2

(12) United States Patent
Asahi et al.

(10) Patent No.: US 10,273,836 B2
(45) Date of Patent: Apr. 30, 2019

(54) VALVE OPENING/CLOSING TIMING CONTROL APPARATUS

(71) Applicant: AISIN SEIKI KABUSHIKI KAISHA, Kariya-shi, Aichi-ken (JP)

(72) Inventors: Takeo Asahi, Kariya (JP); Yuji Noguchi, Obu (JP); Tomohiro Kajita, Anjo (JP); Hideyuki Suganuma, Anjo (JP); Hiroyuki Hamasaki, Obu (JP); Hideomi Iyanaga, Nagoya (JP); Toru Sakakibara, Kariya (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 8 days.

(21) Appl. No.: 15/808,399

(22) Filed: Nov. 9, 2017

(65) Prior Publication Data

US 2018/0135474 A1 May 17, 2018

(30) Foreign Application Priority Data

Nov. 14, 2016 (JP) .................. 2016-221636

(51) Int. Cl.
*F01L 1/34* (2006.01)
*F01L 1/344* (2006.01)
(Continued)

(52) U.S. Cl.
CPC .......... *F01L 1/3442* (2013.01); *F01L 1/047* (2013.01); *F02D 13/0219* (2013.01);
(Continued)

(58) Field of Classification Search
CPC ................ F02D 13/0219; F01L 1/3442; F01L 2001/3443; F01L 2001/34433; F01L 2001/34453
(Continued)

(56) References Cited

U.S. PATENT DOCUMENTS 6,311,658 B2    11/2001  Eguchi
6,363,896 B1     4/2002  Speier
(Continued)

FOREIGN PATENT DOCUMENTS

JP    2000-130118 A    5/2000
JP    2009-515090 A    4/2009
(Continued)

OTHER PUBLICATIONS

U.S. Appl. No. 15/808,149, filed Nov. 9, 2017, Takeo Asahi et al.
(Continued)

*Primary Examiner* — Ching Chang
(74) *Attorney, Agent, or Firm* — Buchanan Ingersoll & Rooney PC (57) ABSTRACT

A valve opening/closing timing control apparatus includes: a driving side rotator configured to rotate synchronously with a crankshaft of an internal combustion engine; a driven side rotator disposed coaxially with a rotation axis of the driving side rotator and configured to rotate integrally with a valve opening/closing camshaft; a connecting bolt disposed coaxially with the rotation axis to connect the driven side rotator to the camshaft, and having an advanced angle port and a retarded angle port formed to extend from an outer peripheral surface to an inner space thereof, the advanced angle port and the retarded angle port communicating with an advanced angle chamber and a retarded angle chamber between the driving side rotator and the driven side rotator, respectively; and a valve unit disposed in the inner space of the connecting bolt.

4 Claims, 7 Drawing Sheets

(51) Int. Cl.
 *F02D 13/02* (2006.01)
 *F01L 1/047* (2006.01)
(52) U.S. Cl.
 CPC .................. *F01L 2001/3443* (2013.01); *F01L 2001/3444* (2013.01); *F01L 2001/34433* (2013.01); *F01L 2001/34453* (2013.01); *F01L 2001/34469* (2013.01); *F01L 2001/34483* (2013.01); *F01L 2250/02* (2013.01)
(58) Field of Classification Search
 USPC .......................................... 123/90.15, 90.17
 See application file for complete search history.

(56) References Cited

U.S. PATENT DOCUMENTS

| | | | |
|---|---|---|---|
| 7,389,756 | B2 | 6/2008 | Hoppe et al. |
| 8,171,904 | B2 * | 5/2012 | Watanabe ............. F01L 1/3442 123/90.17 |
| 2017/0122138 | A1 | 5/2017 | Noguchi et al. |
| 2017/0130621 | A1 | 5/2017 | Suganuma et al. |

FOREIGN PATENT DOCUMENTS

| | | | |
|---|---|---|---|
| JP | 2016-048043 A | | 4/2016 |
| JP | 2017-089477 A | | 5/2017 |

OTHER PUBLICATIONS

U.S. Appl. No. 15/807,926, filed Nov. 9, 2017, Tomohiro Kajita et al.
U.S. Appl. No. 15/807,996, filed Nov. 9, 2017, Tomohiro Kajita et al.

* cited by examiner

VALVE OPENING/CLOSING TIMING CONTROL APPARATUS

CROSS REFERENCE TO RELATED APPLICATIONS

This application is based on and claims priority under 35 U.S.C. § 119 to Japanese Patent Application 2016-221636, filed on Nov. 14, 2016, the entire contents of which are incorporated herein by reference.

TECHNICAL FIELD

This disclosure relates to a valve opening/closing timing control apparatus.

BACKGROUND DISCUSSION

As a valve opening/closing timing control apparatus, JP 2000-130118 A (Reference 1) discloses a technology in which a driven side rotator (a rotating member in Reference 1), which rotates along with a camshaft, and a driving side rotator (a rotation transmission member), which rotates along with a crankshaft, are provided, and a spool valve is provided coaxially with a connecting bolt (a mounting bolt), which connects and fixes the driven side rotator to the camshaft.

In the technology of Reference 1, a hydraulic oil is controlled by moving the spool valve in the axial direction using an actuator and a relative rotation phase between the driving side rotator and the driven side rotator is changed by the oil pressure of the hydraulic oil so as to arbitrarily set a valve opening/closing timing.

U.S. Pat. No. 6,363,896 (Reference 2) discloses a technology in which a driven side rotator (an inner element in Reference 2), which integrally rotates with a camshaft, and a driving side rotator (an outer element), which is driven by a crankshaft, are provided, and a spool is provided in a connecting bolt (a screw), which connects the driven side rotator to the camshaft.

In the technology of Reference 2, the supply and discharge of a fluid are controlled by moving the spool using an actuator so that a valve opening/closing timing is arbitrarily set by the fluid.

In addition, JP 2016-048043 A (Reference 3) discloses a technology in which a spool is provided in a connecting bolt, as in References 1 and 2, so that a hydraulic oil is controlled by moving the spool from the outside, and a sleeve is fitted onto the bolt.

In the technology of Reference 3, an introduction path, which supplies the hydraulic oil from an oil pump to the sleeve, is formed between the outer periphery of the connecting bolt and the inner periphery of the sleeve.

As described in References 1 to 3, since the configuration in which the spool is provided inside the connecting bolt may reduce the distance between the spool and the advanced angle chamber or the retarded angle chamber formed between the driving side rotator and the driven side rotator, the pressure loss of a flow path is reduced, thereby implementing an operation with good responsiveness.

However, in the configuration disclosed in References 1 and 2, since a flow path is formed in the connecting bolt or a member surrounding the connecting bolt, the flow path is easily complicated and increased in size.

On the other hand, in the configuration of Reference 3, since the hydraulic oil is discharged from the tip end side of the connecting bolt, the oil path is simplified, compared to that in References 1 and 2. However, in the configuration of Reference 3, since the introduction path, which supplies the hydraulic oil from the oil pump to the sleeve, is formed between the outer periphery of the connecting bolt and the inner periphery of the sleeve, a configuration of this portion is complicated.

In particular, in the configuration of Reference 3, although an oil path may be simplified by forming an introduction path using the sleeve, it is conceivable that pressure loss occurs in the introduction path, causing deterioration in responsiveness.

Thus, a need exists for a valve opening/closing timing control apparatus which is not susceptible to the drawback mentioned above.

SUMMARY

A feature of an aspect of this disclosure resides in that a valve opening/closing timing control apparatus includes: a driving side rotator configured to rotate synchronously with a crankshaft of an internal combustion engine; a driven side rotator disposed coaxially with a rotation axis of the driving side rotator and configured to rotate integrally with a valve opening/closing camshaft; a connecting bolt disposed coaxially with the rotation axis to connect the driven side rotator to the camshaft, and having an advanced angle port and a retarded angle port formed to extend from an outer peripheral surface to an inner space thereof, the advanced angle port and the retarded angle port communicating with an advanced angle chamber and a retarded angle chamber between the driving side rotator and the driven side rotator, respectively; and a valve unit disposed in the inner space of the connecting bolt, in which the valve unit includes a sleeve provided on an inner peripheral surface of the inner space of the connecting bolt, and having an advanced angle communication hole that communicates with the advanced angle port and a retarded angle communication hole that communicates with the retarded angle port, the advanced angle communication hole and the retarded angle communication hole are disposed in a same phase around the rotation axis, and an engagement portion is provided to determine relative postures of the sleeve and the connecting bolt in relation to the connecting bolt around the rotation axis, and the engagement portion is configured with an engagement recess formed by cutting out a wall portion that is formed in an annular shape in an inner periphery of the inner space and an engagement protrusion formed on an end portion of the sleeve.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments disclosed here will be described with reference to the drawings.

[Basic Configuration]

Figure 1:
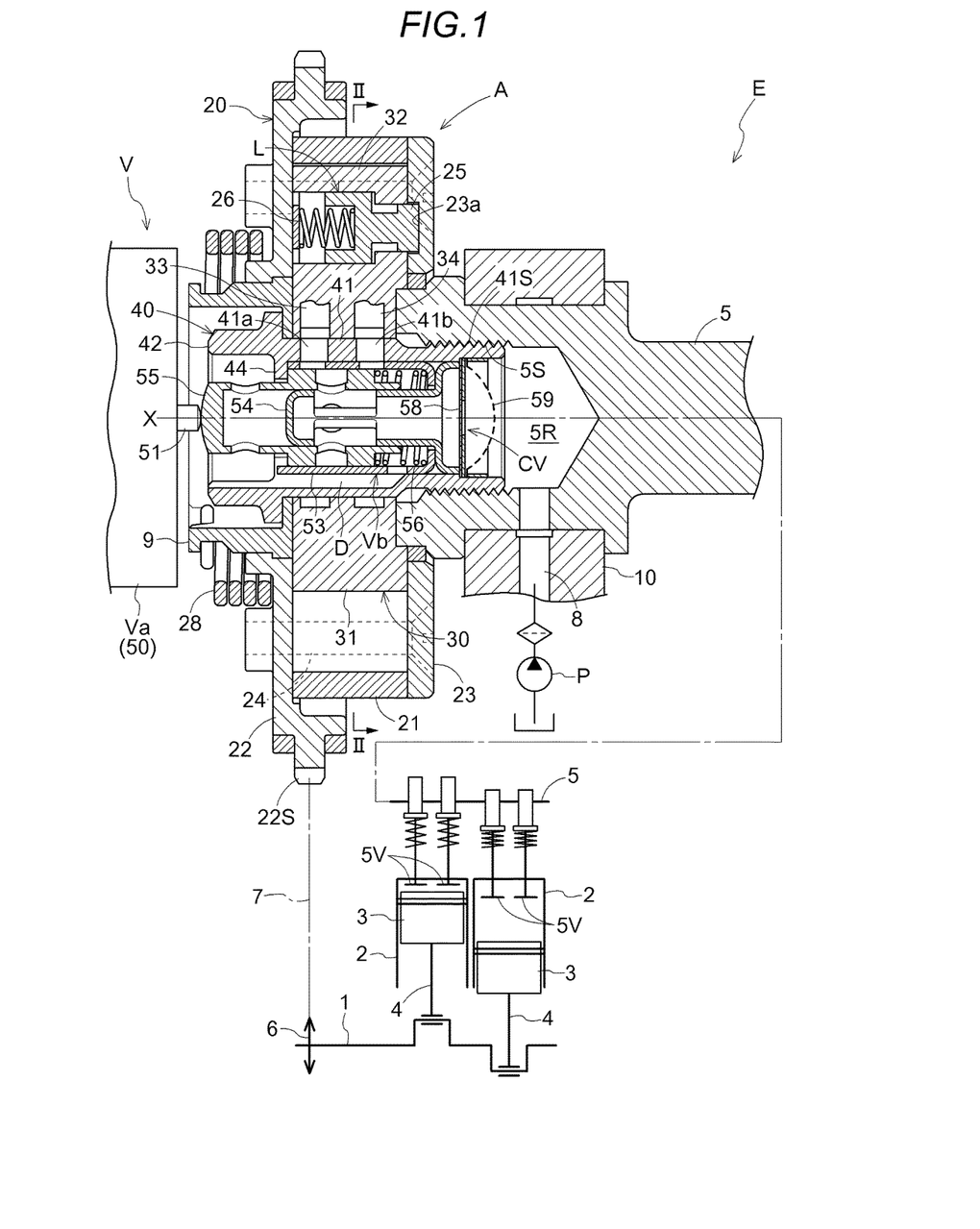
FIG. 1 is a cross-sectional view illustrating an entire configuration of a valve opening/closing timing control apparatus.
Figure 2:
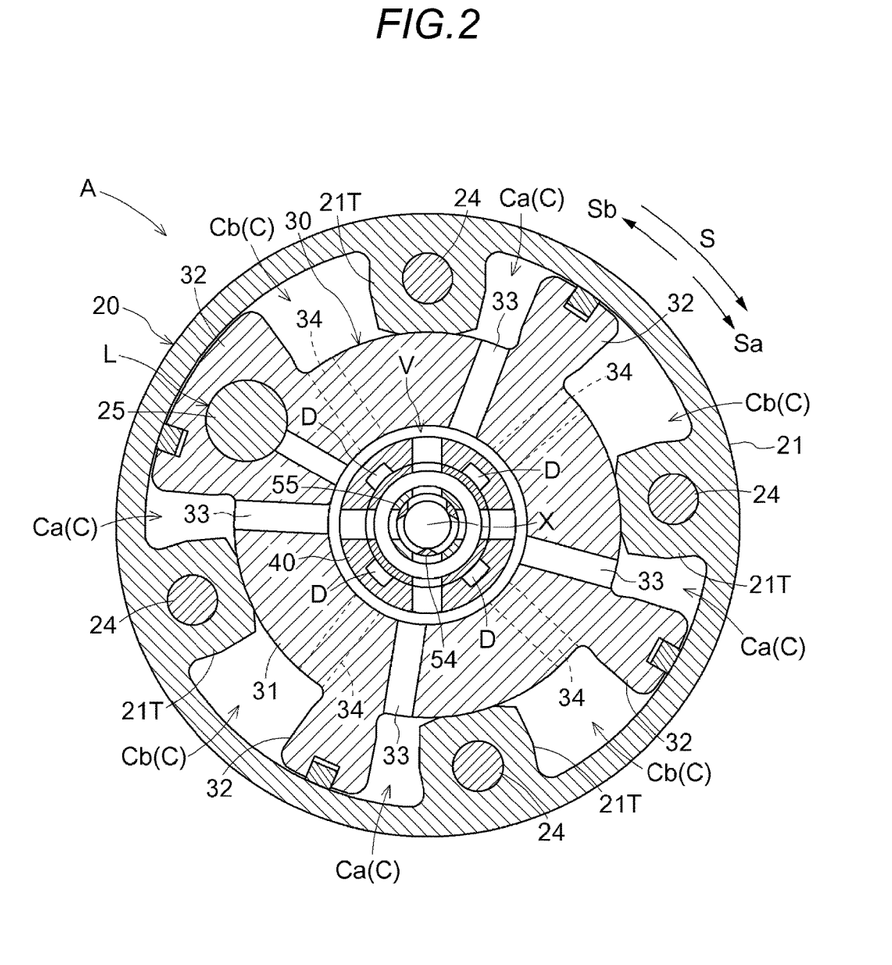
FIG. 2 is a cross-sectional view taken along line II-II of FIG. 1.
Figure 3:
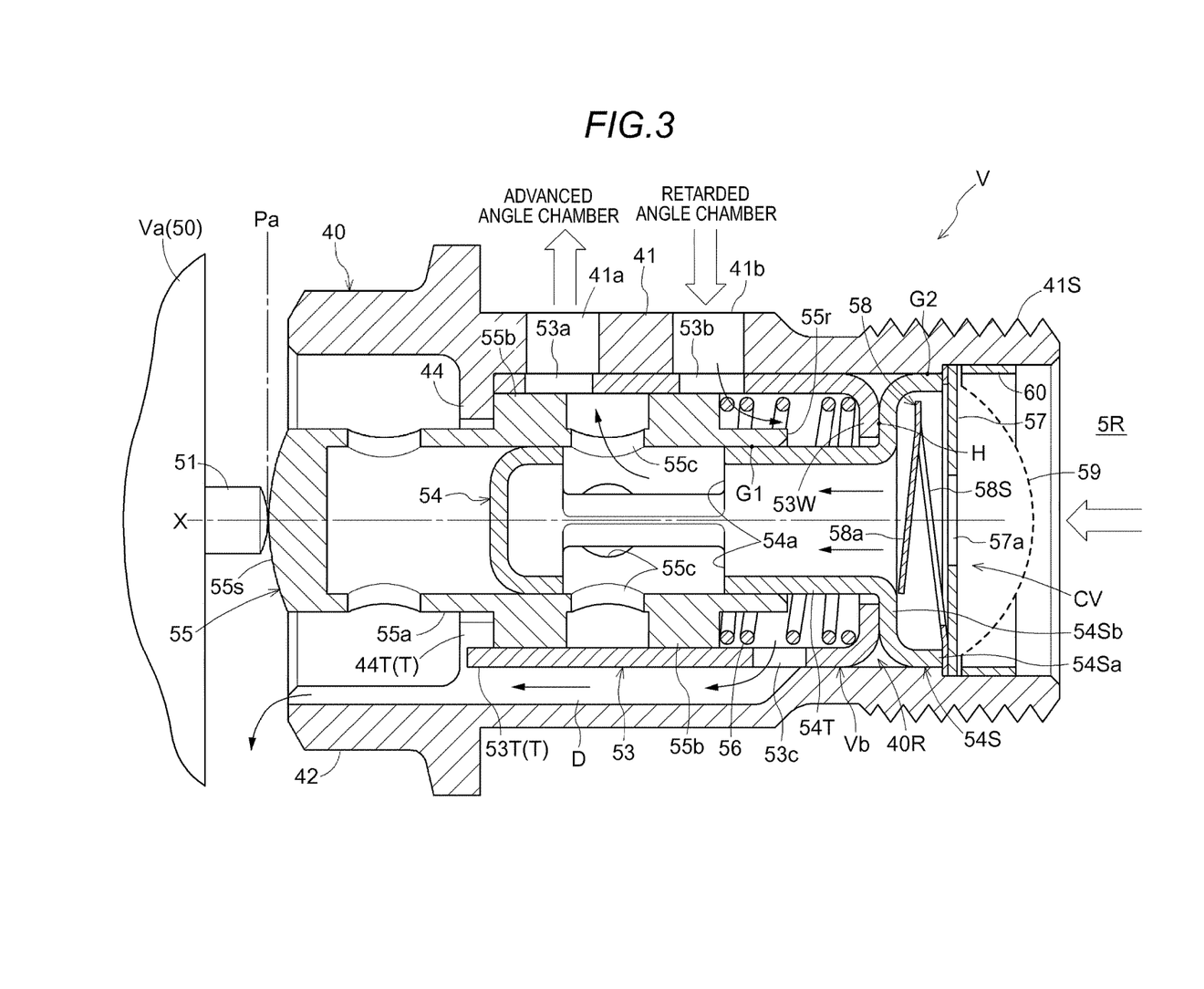
FIG. 3 is a cross-sectional view of a valve unit in which a spool is located at the advanced angle position.

As illustrated in FIGS. 1 to 3, a valve opening/closing timing control apparatus A includes an outer rotor 20 as a driving side rotator, an inner rotor 30 as a driven side rotator, and an electromagnetic control valve V, which controls a hydraulic oil as a hydraulic fluid.

The inner rotor 30 (an example of the driven side rotator) is disposed coaxially with a rotation axis X of an intake camshaft 5, and is connected to the intake camshaft 5 by a connecting bolt 40 so as to rotate integrally with the intake camshaft 5. The outer rotor 20 (an example of the driving side rotator) is disposed coaxially with the rotation axis X and rotates synchronously with a crankshaft 1 of an engine E as an internal combustion engine. In addition, the outer rotor 20 encloses the inner rotor 30, and the outer rotor 20 and the inner rotor 30 are supported to be rotatable in relation to each other.

The electromagnetic control valve V includes an electromagnetic unit Va supported by the engine E, and also includes a valve unit Vb accommodated in an inner space 40R of the connecting bolt 40.

The electromagnetic unit Va includes a solenoid unit 50 and a plunger 51, which is disposed coaxially with the rotation axis X and moves back and forth by the driving control of the solenoid unit 50. The valve unit Vb includes a spool 55, which is disposed coaxially with the rotation axis X to control the supply and discharge of the hydraulic oil (an example of the hydraulic fluid).

With this configuration, the amount of protrusion of the plunger 51 is set by the control of electric power supplied to the solenoid unit 50, and in conjunction with this, the spool 55 is operated in the direction along the rotation axis X. As a result, the hydraulic oil to the spool 55 is controlled, a relative rotation phase between the outer rotor 20 and the inner rotor 30 is determined, and the control of an opening/closing timing of an intake valve 5V is implemented. The configuration of the electromagnetic control valve V and the control mode of the hydraulic oil will be described later.

[Engine and Valve Opening/Closing Timing Control Apparatus]

An engine E (an example of an internal combustion engine) illustrated in FIG. 1 is provided in a vehicle such as a passenger car. The engine E is configured in a four-cycle form in which a piston 3 is accommodated in a cylinder bore of a cylinder block 2 at an upper position, and the piston 3 and the crankshaft 1 are connected to each other via a connecting rod 4. The intake camshaft 5, which opens or closes the intake valve 5V, and an exhaust camshaft (not illustrated) are provided in the upper region of the engine E.

In an engine constituting member 10, which rotatably supports the intake camshaft 5, a supply flow path 8 is formed to supply the hydraulic oil from a hydraulic pump P, which is driven in the engine E. The hydraulic pump P supplies a lubrication oil, which is stored in an oil pan of the engine E and serves as the hydraulic oil (an example of the hydraulic fluid), to the electromagnetic control valve V through the supply flow path 8.

A timing chain 7 is wound around an output sprocket 6, which is formed on the crankshaft 1 of the engine E, and a timing sprocket 22S of the outer rotor 20. Thus, the outer rotor 20 rotates synchronously with the crankshaft 1. In addition, a sprocket is also provided on the front end of the exhaust camshaft at the exhaust side, and the timing chain 7 is also wound around the sprocket.

As illustrated in FIG. 2, the outer rotor 20 rotates in a driving rotation direction S by a driving force from the crankshaft 1. A direction in which the inner rotor 30 relatively rotates in the same direction as the driving rotation direction S in relation to the outer rotor 20 is referred to as an advanced angle direction Sa, and the opposite direction thereto is referred to as a retarded angle direction Sb. In the valve opening/closing timing control apparatus A, a relationship between the crankshaft 1 and the intake camshaft 5 is set such that an intake compression ratio is increased as the amount of displacement is increased when the relative rotation phase is displaced in the advanced angle direction Sa and the intake compression ratio is reduced as the amount of displacement is increased when the relative rotation phase is displaced in the retarded angle direction Sb.

In addition, in this embodiment, the valve opening/closing timing control apparatus A provided on the intake camshaft 5 is illustrated, but the valve opening/closing timing control apparatus A may be provided on the exhaust camshaft, or may be provided on both the intake camshaft 5 and the exhaust camshaft.

As illustrated in FIG. 1, the outer rotor 20 includes an outer rotor main body 21, a front plate 22, and a rear plate 23, which are integrated with one another by fastening of a plurality of fastening bolts 24. The timing sprocket 22S is formed on the outer periphery of the front plate 22. In addition, an annular member 9 is fitted into the inner periphery of the front plate 22 and a bolt head portion 42 of the connecting bolt 40 is pressed against the annular member 9, whereby the annular member 9, an inner rotor main body 31, and the intake camshaft 5 are integrated with one another.

[Outer Rotor and Inner Rotor]

As illustrated in FIG. 2, a plurality of protrusions 21T, which protrudes inward in the radial direction, is integrally formed on the outer rotor main body 21. The inner rotor 30 includes the cylindrical inner rotor main body 31, which is in close contact with the protrusions 21T of the outer rotor main body 21, and four vane portions 32, which protrude outward in the radial direction from the outer periphery of the inner rotor main body 31 to come into contact with the inner peripheral surface of the outer rotor main body 21.

As described above, the outer rotor 20 encloses the inner rotor 30 so that a plurality of fluid pressure chambers C is formed on the outer peripheral side of the inner rotor main body 31 at an intermediate position between the neighboring protrusions 21T in the rotational direction. Each fluid pressure chamber C is divided, by a corresponding one of the vane portions 32, into an advanced angle chamber Ca and a retarded angle chamber Cb. Moreover, the inner rotor 30 is formed with an advanced angle flow path 33, which communicates with the advanced angle chamber Ca, and a retarded angle flow path 34, which communicates with the retarded angle chamber Cb.

As illustrated in FIG. 1, a torsion spring 28 is provided over the outer rotor 20 and the annular member 9 in order to assist the displacement of the relative rotation phase (hereinafter, referred to as "relative rotation phase") between the outer rotor 20 and the inner rotor 30 in the advanced angle direction Sa from the most retarded angle phase by applying a biasing force in the advanced angle direction Sa.

As illustrated in FIGS. 1 and 2, the valve opening/closing timing control apparatus A includes a lock mechanism L, which maintains the relative rotation phase between the outer rotor 20 and the inner rotor 30 at the most retarded angle phase. The lock mechanism L includes a lock member 25, which is supported to be movable back and forth in the direction along the rotation axis X in relation to one vane portion 32, a lock spring 26, which biases the lock member 25 to protrude, and a lock recess 23*a*, which is formed in the rear plate 23. In addition, the lock mechanism L may be configured to guide the lock member 25 so as to move along the radial direction.

The unlocking of the lock mechanism L is performed as the pressure of the hydraulic oil acting on the advanced angle flow path 33 is applied to the lock member 25 in an unlocking direction. In addition, when the relative rotation phase between the outer rotor 20 and the inner rotor 30 is displaced in the retarded angle direction Sb and reaches the most retarded angle phase, the lock member 25 is engaged with the lock recess 23*a* by a biasing force of the lock spring 26, whereby the lock mechanism L reaches a locked state. Then, when the hydraulic oil is supplied to the advanced angle flow path 33 in a state where the lock mechanism L is in the locked state, the unlocking may be achieved by separating the lock member 25 from the lock recess 23*a* using the pressure of the hydraulic oil. In addition, after the locked state of the lock mechanism L is released, the relative rotation phase is displaced in the advanced angle direction Sa.

[Connecting Bolt]

As illustrated in FIGS. 3 to 6, the connecting bolt 40 is configured by integrally forming a bolt main body 41, which generally has a cylindrical shape, with the bolt head portion 42 on an outer end portion (the left side in FIG. 3) of the bolt main body 41. The inner space 40R is formed inside the connecting bolt 40 so as to penetrate in the direction along the rotation axis X, and a male screw portion 41S is formed on the outer periphery of an inner end portion (the right side in FIG. 3) of the bolt main body 41.

As illustrated in FIG. 1, the intake camshaft 5 is formed with an in-shaft space 5R around the rotation axis X, and a female screw portion 5S is formed on the inner periphery of the in-shaft space 5R. The in-shaft space 5R communicates with the above-described supply flow path 8 so that the hydraulic oil is supplied thereto from the hydraulic pump P.

With this configuration, in a state where the annular member 9, the outer rotor 20 and the inner rotor 30 are inserted into the bolt main body 41, the male screw portion 41S is screwed into the female screw portion 5S of the intake camshaft 5 so that the inner rotor 30 is fastened to the intake camshaft 5 by the rotating operation of the bolt head portion 42. With this fastening, the annular member 9 and the inner rotor 30 are fastened and fixed to the intake camshaft 5 so that the in-shaft space 5R and the connecting bolt 40 communicate with each other.

A restriction wall 44, which is a wall portion protruding in the direction such that it becomes close to the rotation axis X, is formed on the inner peripheral surface of the inner space 40R of the connecting bolt 40 at the outer end side in the direction along the rotation axis X. In addition, a plurality of (four) drain grooves D (an example of a drain flow path) is formed in a posture along the rotation axis X in the area from the intermediate position to the tip end in the inner peripheral surface of the connecting bolt 40. Thus, engagement recesses 44T are formed in the portion of the restriction wall 44 that overlaps the four drain grooves D.

An advanced angle port 41*a*, which communicates with the advanced angle flow path 33, and a retarded angle port 41*b*, which communicates with the retarded angle flow path 34, are formed in the bolt main body 41 from the outer peripheral surface to the inner space 40R. In addition, the restriction wall 44 restricts the position of a sleeve 53 to be described later by coming into contact with the outer end portion of the sleeve 53 (the left end portion in FIG. 3), and also restricts the position of the protruding side of the spool 55 by coming into contact with a land portion 55*b* of the spool 55 to be described later.

[Valve Unit]

As illustrated in FIGS. 3 to 6, the valve unit Vb includes the sleeve 53, which is fitted into the inner space 40R of the connecting bolt 40 so as to come into close contact with the inner peripheral surface of the bolt main body 41, a fluid supply pipe 54, which is accommodated coaxially with the rotation axis X in the inner space 40R, and the spool 55, which is disposed to be slidable in the direction along the rotation axis X in a state of being guided on the inner peripheral surface of the sleeve 53 and the outer peripheral surface of a pipe passage portion 54T of the fluid supply pipe 54.

Moreover, the valve unit Vb includes a spool spring 56 as a biasing member that biases the spool 55 in the protruding direction, a check valve CV, an oil filter 59, and a fixing ring 60. The check valve CV includes an opening plate 57 and a valve plate 58.

[Valve Unit: Sleeve]

As illustrated in FIGS. 3 to 6, the sleeve 53 has a cylindrical shape around the rotation axis X and is formed with a plurality of (two) engagement protrusions 53T, which protrudes in the direction along the rotation axis X, on the outer end side (the left side in FIG. 3) thereof. The inner end side (the right side in FIG. 3) of the sleeve 53 is bent in a posture orthogonal to the rotation axis X so as to form an end wall 53W via drawing or the like.

The above-described restriction wall 44 is formed in an annular area. The engagement recesses 44T are formed at four positions by cutting out the portions thereof corresponding to the drain grooves D.

In addition, each engagement protrusion 53T is engaged with a corresponding one of the engagement recesses 44T constituting an engagement portion T, whereby the posture of the sleeve 53 around the rotation axis X is determined and a drain hole 53*c* to be described later remains in communication with each drain groove D. The engagement recesses 44T and the engagement protrusions 53T formed on the sleeve 53 constitute the engagement portions T, which determine the posture of the sleeve 53.

In addition, a plurality of advanced angle communication holes 53*a*, which causes the advanced angle ports 41*a* to communicate with the inner space 40R, a plurality of retarded angle communication holes 53*b*, which causes the inner space 40R to communicate with the retarded angle ports 41*b*, and a plurality of drain holes 53*c*, which discharges the hydraulic oil of the inner space 40R to the outer surface side of the sleeve 53, are formed in a hole shape. Each of the advanced angle communication holes 53*a*, the retarded angle communication holes 53*b*, and the drain holes 53*c* is formed in a rectangular shape having a pair of opening edges in a posture along the rotation axis X and a pair of opening edges in a posture orthogonal thereto.

The advanced angle communication holes 53*a* and the retarded angle communication holes 53*b* are formed in parallel in the direction along the rotation axis X at four positions in the circumferential direction around the rotation axis X. In addition, the drain holes 53c are formed at four positions, which have different phases from the advanced angle communication holes 53a and the retarded angle communication holes 53b, in the circumferential direction around the rotation axis X.

The above-described engagement protrusions 53T are disposed on an extension in the direction along the rotation axis X on the basis of two of the four drain holes 53c at opposite positions with the rotation axis X interposed therebetween.

With this configuration, by engaging the engagement protrusions 53T with the engagement recesses 44T of the restriction wall 44 and fitting the sleeve 53 in a state where the front end edge of the sleeve 53 comes into contact with the restriction wall 44, the advanced angle communication holes 53a and the advanced angle ports 41a communicate with each other and the retarded angle communication holes 53b and the retarded angle ports 41b communicate with each other such that the drain holes 53c remain in communication with the drain grooves D.

[Valve Unit: Fluid Supply Pipe]

As illustrated in FIGS. 3 to 6, in the fluid supply pipe 54, a base end portion 54S, which is fitted into the inner space 40R, and the pipe passage portion 54T, which has a diameter smaller than that of the base end portion 54S, are integrally formed, and supply ports 54a are formed in the outer periphery of the tip end portion of the pipe passage portion 54T.

The base end portion 54S includes a cylindrical fitting portion 54Sa around the rotation axis X, and an intermediate wall 54Sb formed in an area from the cylindrical fitting portion 54Sa to the pipe passage portion 54T in a posture orthogonal to the rotation axis X.

Three supply ports 54a, formed in the outer periphery of the tip end portion of the pipe passage portion 54T, have an elongated hole shape that extends in the direction along the rotation axis X, and four intermediate apertures 55c formed in the spool 55 have a circular shape. In addition, because the number of supply ports 54a and the number of intermediate apertures 55c formed in the spool 55 are different from each other, and the opening width of the supply ports 54a in the circumferential direction is larger than the width of an intermediate portion between the neighboring supply ports 54a in the circumferential direction (a portion of the pipe passage portion 54T between the neighboring supply ports 54a), the hydraulic oil from the pipe passage portion 54T may be reliably supplied to the intermediate apertures 55c. In addition, in order to reliably supply the hydraulic oil from the supply ports 54a to the intermediate apertures 55c, it is convenient to set the number of supply ports 54a and the number of intermediate apertures 55c to be different from each other, and it is effective to set the opening width of the supply ports 54a in the circumferential direction to be as large as possible.

[Valve Unit: Spool and Spool Spring]

As illustrated in FIGS. 3 to 6, the spool 55 includes a spool main body 55a, which has a cylindrical shape and is formed with an operation end portion 55s at the tip end thereof, a pair of land portions 55b, which is formed on the outer periphery of the spool main body 55a so as to protrude therefrom, and a plurality of (four) intermediate apertures 55c, which cause the intermediate position between the pair of land portions 55b to communicate with the inside of the spool 55.

The spool 55 is formed, on the opposite side to the operation end portion 55s, with a contact end portion 55r, which determines an operation limit by coming into contact with the end wall 53W when the spool 55 is operated in a press-fitting direction. The contact end portion 55r is formed on the end portion of an extended area of the spool main body 55a to have a smaller diameter than that of the land portion 55b, thereby suppressing the spool 55 from operating beyond the operation limit even when the spool 55 is operated to be press-fitted with an excessive force.

The spool spring 56 is of a compression coil type, and is disposed between the inner land portion 55b on the inner side and the end wall 53W of the sleeve 53. Due to the action of a biasing force of the spool spring 56, the land portion 55b on the outer end side is brought into contact with the restriction wall 44, and as a result, the spool 55 is maintained at the advanced angle position Pa illustrated in FIG. 3.

In particular, in the valve unit Vb, a first fitting area G1 of a first clearance is formed between the outer periphery of the pipe passage portion 54T of the fluid supply pipe 54 and the inner peripheral surface of the spool 55 so as to enable slight relative movement of each of both in the radial direction. In addition, a second fitting area G2 of a second clearance is formed between the outer periphery of the cylindrical fitting portion 54Sa of the base end portion 54S of the fluid supply pipe 54 and the inner peripheral surface of the inner space 40R so as to enable slight relative movement of each of both in the radial direction. In addition, the first clearance of the first fitting area G1 is set to be smaller than the second clearance of the second fitting area G2.

By setting the clearances in this manner, the supply of the hydraulic oil from the supply ports 54a of the pipe passage portion 54T of the fluid supply pipe 54 to the intermediate apertures 55c of the spool 55 may be efficiently performed while suppressing leakage. In addition, by setting the clearances in this manner, although the clearance of the second fitting area G2 between the outer periphery of the base end portion 54S of the fluid supply pipe 54 and the inner peripheral surface of the inner space 40R is expanded compared to the clearance of the first fitting area G1 such that the position of the base end portion 54S is slightly changed in the radial direction, the sliding resistance of the spool 55 may be maintained at a low value because the phenomenon in which the axial posture of the fluid supply pipe 54 is displaced so as to follow the axis of the spool 55 is allowed.

In addition, in this configuration, the first clearance of the first fitting area G1 may be set to be larger than the second clearance of the second fitting area G2.

Moreover, in the valve unit Vb, the end wall 53W of the sleeve 53 and the intermediate wall 54Sb of the fluid supply pipe 54 have a positional relationship set to come into contact with each other, and the end wall 53W and the intermediate wall 54Sb, which come into contact with each other, have an increased planar accuracy, thereby being configured as a seal portion H that prevents the flow of the hydraulic oil.

That is, in this configuration, since the position of the base end portion 54S of the fluid supply pipe 54 is fixed by the fixing ring 60, the base end portion 54S functions as a retainer. In addition, since the biasing force of the spool spring 56 acts on the end wall 53W of the sleeve 53, the end wall 53W is pressed against the intermediate wall 54Sb of the base end portion 54S. Thus, by setting the postures of the end wall 53W and the intermediate wall 54Sb such that both come into close contact with each other, the end wall 53W is brought into close contact with the intermediate wall 54Sb using the biasing force of the spool spring 56, thereby configuring this portion as the seal portion H.

By forming the seal portion H in this manner, for example, even if the hydraulic oil supplied from the hydraulic pump P is introduced into the space between the outer periphery of the cylindrical fitting portion 54Sa and the inner surface of the inner space 40R of the connecting bolt 40, it is possible to solve the problem that the hydraulic oil flows from the inside of the sleeve 53 to the drain grooves D.

[Modification of Valve Unit]

The valve unit Vb may be configured by reversely setting the arrangements of the advanced angle port 41a and the retarded angle port 41b formed in the bolt main body 41 and reversely setting the arrangements of the advanced angle communication holes 53a and the retarded angle communication holes 53b formed in the sleeve 53. In the case where the valve unit Vb is configured in this manner, the advanced angle position Pa and the retarded angle position Pb of the spool 55 also have a reverse relationship.

[Check Valve Etc.]

Figure 6:
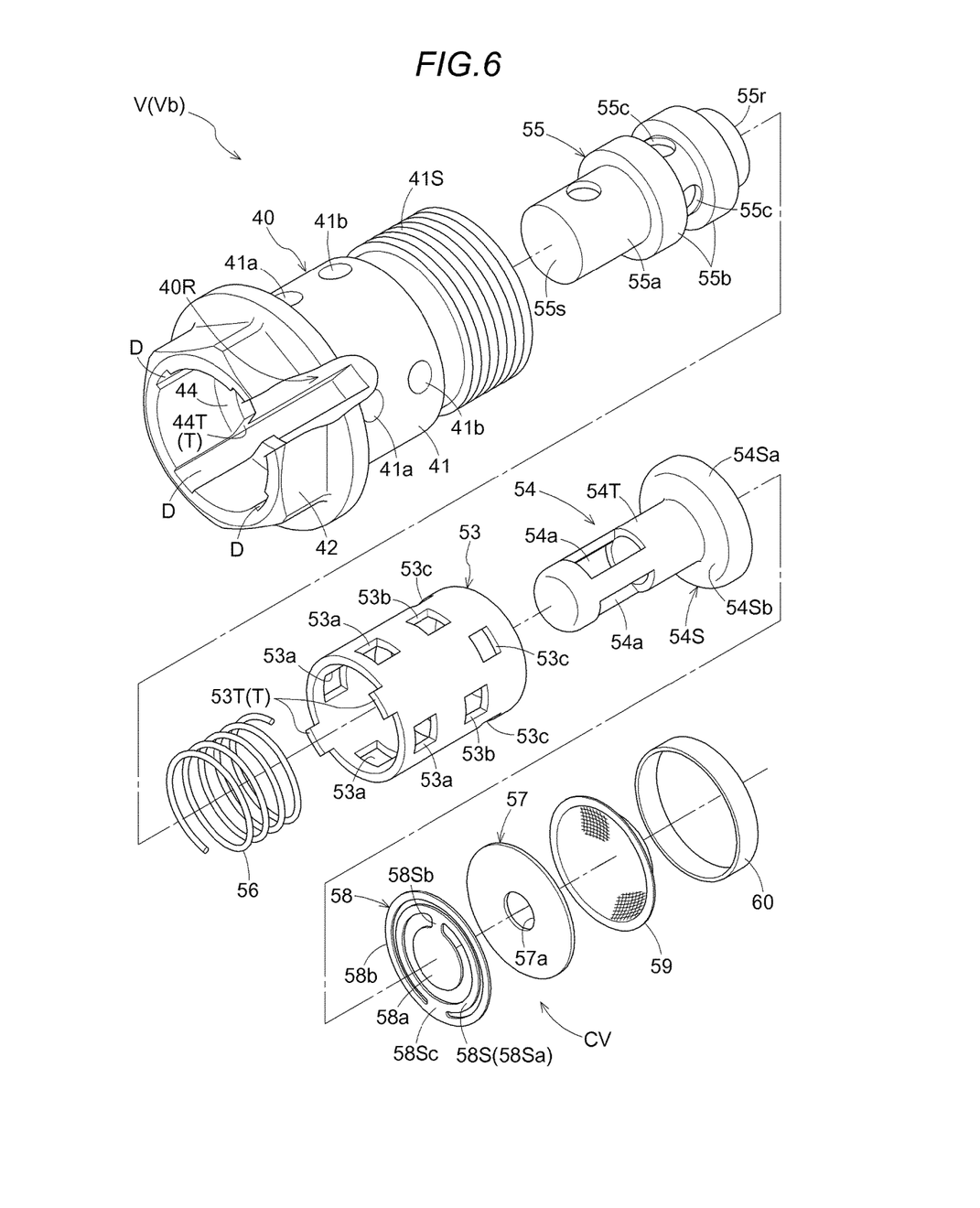
FIG. 6 is an exploded perspective view of the valve unit.

As illustrated in FIG. 6, the opening plate 57 and the valve plate 58, which constitute the check valve CV, are manufactured using metal plate members having the same outer diameter, and the opening plate 57 has a circular opening 57a formed in the central position thereof around the rotation axis X.

In addition, the valve plate 58 includes a circular valve body 58a, which is disposed at the center position thereof and has a diameter larger than that of the above-described opening 57a, an annular portion 58b, which is disposed on the outer periphery thereof, and a spring portion 58S, which interconnects the valve body 58a and the annular portion 58b.

In particular, the spring portion 58S includes an annular intermediate spring portion 58Sa, which is disposed on the inner peripheral side of the annular portion 58b, a first deformable portion 58Sb (an example of an elastically deformable portion), which interconnects the outer periphery of the intermediate spring portion 58Sa and the inner periphery of the annular portion 58b, and a second deformable portion 58Sc (an example of an elastically deformable portion), which interconnects the inner periphery of the intermediate spring portion 58Sa and the valve body 58a.

Figure 5:
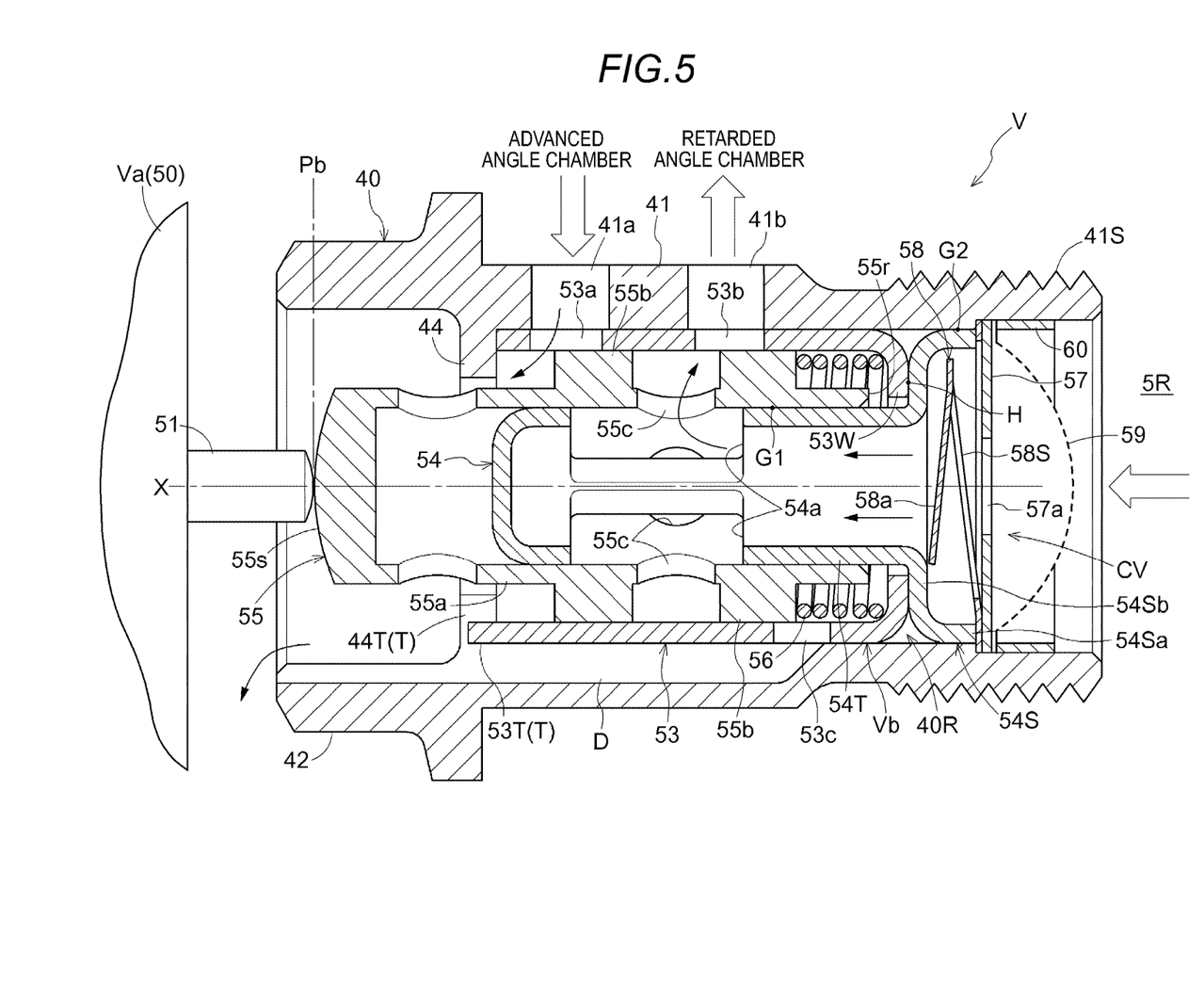
FIG. 5 is a cross-sectional view of the valve unit in which the spool is located at the retarded angle position.

In addition, in the check valve CV, as illustrated in FIGS. 3 and 5, a positional relationship is set such that, when the hydraulic oil is supplied, the first deformable portion 58Sb and the second deformable portion 58Sc are elastically deformed so that the valve body 58a has a posture tilted in relation to the rotation axis X, and thus the valve body 58a is brought into contact with the intermediate wall 54Sb of the fluid supply pipe 54 thereby being stabilized.

Figure 4:
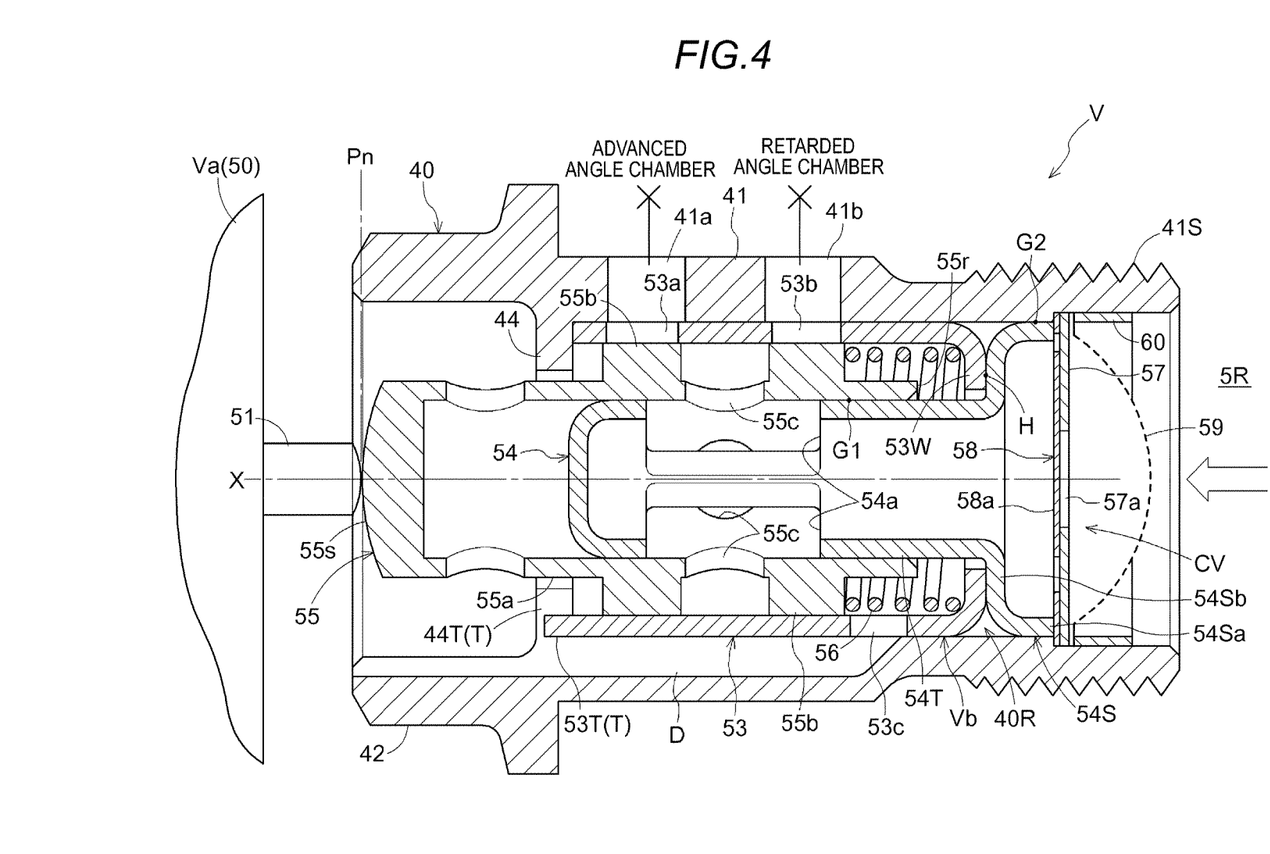
FIG. 4 is a cross-sectional view of the valve unit in which the spool is located at the neutral position.

In addition, when the pressure on the downstream side from the check valve CV increases, when the discharge pressure of the hydraulic pump P decreases, or when the spool 55 is set to the neutral position Pn, the valve body 58a is brought into close contact with the opening plate 57 by the biasing force of the spring portion 58S so as to close the opening 57a, as illustrated in FIG. 4.

Moreover, the oil filter 59 is provided with a filtering portion having an outer diameter which is the same as the opening plate 57 and the valve plate 58 and having a mesh-type member, the center portion of which expands toward the upstream side in the supply direction of the hydraulic oil. The fixing ring 60 is press-fitted into and fixed to the inner periphery of the connecting bolt 40, and the positions of the oil filter 59, the opening plate 57, and the valve plate 58 are determined by the fixing ring 60.

With this configuration, when assembling the valve unit Vb, the spool spring 56 and the spool 55 are inserted into the sleeve 53, and the sleeve 53 is inserted into the inner space 40R of the connecting bolt 40. During this insertion, the engagement protrusions 53T of the sleeve 53 are engaged with the engagement recesses 44T of the restriction wall 44 such that a relative rotational posture of the connecting bolt 40 and the sleeve 53 around the rotation axis X is determined.

Next, the fluid supply pipe 54 is disposed such that the pipe passage portion 54T of the fluid supply pipe 54 is inserted into the inner periphery of the spool main body 55a of the spool 55. With this arrangement, the base end portion 54S of the fluid supply pipe 54 has a positional relationship in which it is fitted into the inner peripheral wall of the inner space 40R of the connecting bolt 40. Moreover, by making the opening plate 57 and the valve plate 58, which constitute the check valve CV, overlap each other, and disposing the oil filter 59 in the inner space 40R to further overlap therewith, the fixing ring 60 is press-fitted into and fixed to the inner periphery of the inner space 40R.

With this fixing using the fixing ring 60, the outer end of the sleeve 53 is brought into a state of being in contact with the restriction wall 44, and the position thereof in the direction along the rotation axis X is determined.

[Operation Mode]

In the valve opening/closing timing control apparatus A, in a state where no electric power is supplied to the solenoid unit 50 of the electromagnetic unit Va, no pressing force is applied to the spool 55 from the plunger 51, and as illustrated in FIG. 3, the spool 55 is maintained at the position at which the land portion 55b at the outer side position comes into contact with the restriction wall 44 by the biasing force of the spool spring 56.

This position of the spool 55 is the advanced angle position Pa, and from the positional relationship between the pair of land portions 55b and the advanced angle communication holes 53a and the retarded angle communication holes 53b, the intermediate apertures 55c of the spool 55 and the advanced angle communication holes 53a communicate with each other, and the retarded angle communication holes 53b communicates with the inside (the inner space 40R) of the sleeve 53.

Thus, the hydraulic oil supplied from the hydraulic pump P is supplied from the supply ports 54a of the fluid supply pipe 54 to the advanced angle chamber Ca through the intermediate apertures 55c of the spool 55, the advanced angle communication holes 53a, and the advanced angle ports 41a.

At the same time, the hydraulic oil in the retarded angle chamber Cb flows from the retarded angle ports 41b to the drain holes 53c through the retarded angle communication holes 53b and is discharged outward from the end portion on the head portion side of the connecting bolt 40 through the drain grooves D. As a result of the supply and discharge of the hydraulic oil, the relative rotation phase is displaced in the advanced angle direction Sa.

In particular, when the hydraulic oil is supplied by setting the spool 55 to the advanced angle position Pa when the lock mechanism L is in the locked state, some of the hydraulic oil supplied to the advanced angle chamber Ca is supplied from the advanced angle flow path 33 to the lock mechanism L so as to separate the lock member 25 from the lock recess 23a, thereby implementing unlocking.

In addition, the advanced angle position Pa illustrated in FIG. 3 is a state where a flow path area is set to the maximum, and by the adjustment of electric power supplied to the solenoid unit 50, the opening area between the advanced angle communication holes 53a and the advanced angle ports 41a and the flow path area between the retarded angle communication holes 53b and the retarded angle ports 41b may be reduced without changing the flow direction of the hydraulic oil. With this adjustment, the speed of displacement of the relative rotation phase may be adjusted.

By supplying predetermined electric power to the solenoid unit 50 of the electromagnetic unit Va, the plunger 51 may operate to protrude, and the spool 55 may be set to the neutral position Pn illustrated in FIG. 4 against the biasing force of the spool spring 56.

When the spool 55 is set to the neutral position Pn, the pair of land portions 55b has a positional relationship in which the land portions 55b close the advanced angle communication holes 53a and the retarded angle communication holes 53b of the sleeve 53 such that the relative rotation phase is maintained without the supply and discharge of the hydraulic oil to and from the advanced angle chamber Ca and the retarded angle chamber Cb.

By supplying electric power beyond the above-described predetermined electric power to the solenoid unit 50 of the electromagnetic unit Va, the plunger 51 may operate to further protrude, and the spool 55 may be set to the retarded angle position Pb illustrated in FIG. 5.

At the retarded angle position Pb, based on the positional relationship between the pair of land portions 55b, the advanced angle communication holes 53a, and the retarded angle communication holes 53b, the intermediate apertures 55c of the spool 55, and the retarded angle communication holes 53b communicate with each other, and the advanced angle communication holes 53a communicate with an outer space through the inner periphery of the restriction wall 44.

Thus, the hydraulic oil supplied from the hydraulic pump P is supplied from the supply ports 54a of the fluid supply pipe 54 to the retarded angle chamber Cb through the intermediate apertures 55c of the spool 55, the retarded angle communication holes 53b, and the retarded angle ports 41b.

At the same time, the hydraulic oil in the advanced angle chamber Ca flows from the advanced angle ports 41a via the advanced angle communication holes 53a, flows from the gap between the outer periphery of the spool main body 55a and the inner periphery of the restriction wall 44 to the outer periphery of the spool main body 55a, and is discharged outward from the head portion side of the connecting bolt 40. As a result of the supply and discharge of the hydraulic oil, the relative rotation phase is displaced in the retarded angle direction Sb.

The retarded angle position Pb illustrated in FIG. 5 is in a state in which the flow path area is set to the maximum, and through the adjustment of electric power supplied to the solenoid unit 50, it is possible to reduce the flow path area between the retarded angle communication holes 53b and the retarded angle ports 41b and the flow path area between the advanced angle communication holes 53a and the advanced angle ports 41a without changing the flow direction of the hydraulic fluid. With this adjustment, it is possible to adjust the speed of displacement of the relative rotation phase.

Action and Effect of Embodiment

Since the valve unit Vb is disposed in the inner space 40R of the connecting bolt 40 and the hydraulic oil is discharged from the front end of the connecting bolt 40 in this manner, an oil path configuration may be simplified and the number of components may be reduced. When the engagement protrusions 53T formed on the outer end side of the sleeve 53 are engaged with the engagement recesses 44T of the restriction wall 44, the posture of the sleeve 53 is determined and no hydraulic oil leaks from the drain grooves D.

In particular, since the hydraulic oil discharged from the drain hole 53c formed in the sleeve 53 is discharged from the head portion side of the connecting bolt 40 through the drain grooves D at the boundary between the outer surface of the sleeve 53 and the inner surface of the connecting bolt 40, the configuration of a drain flow path is simplified, the number of components is not increased, and the machining process is not complicated.

In addition, since the hydraulic oil may be supplied linearly along the rotation axis X in the fluid supply pipe 54, the hydraulic fluid is supplied, with little pressure loss, to the advanced angle chamber Ca and the retarded angle chamber Cb without pressure reduction, thereby maintaining high responsiveness. Since the opening 57a in the opening plate 57 of the check valve CV is disposed coaxially with the rotation axis X, the check valve CV does not act as an oil path resistance.

Since three supply ports 54a are formed in the tip end of the pipe passage portion 54T of the fluid supply pipe 54 and four intermediate apertures 55c are formed in the spool 55, the hydraulic oil may be reliably supplied from the fluid supply pipe 54 to the intermediate holes 55c regardless of the relative rotation phase thereof around the rotation axis X.

By setting the first fitting area G1, which enables a relative movement between the outer periphery of the pipe passage portion 54T of the fluid supply pipe 54 and the inner peripheral surface of the spool 55, and setting the second fitting area G2 and a clearance between the outer periphery of the cylindrical fitting portion 54Sa of the base end portion 54S of the fluid supply pipe 54 and the inner peripheral surface of the inner space 40R, the smooth operation of the spool 45 is enabled without increasing accuracy.

By using the biasing force acting on the spool spring 56 and increasing the planar accuracy of the end wall 53W and the intermediate wall 54Sb, the end wall 53W and the intermediate wall 54Sb come into close contact with each other to form the seal portion H, which may prevent the hydraulic oil from leaking through the drain holes 53c.

By configuring the check valve CV with two plate members of the opening plate 57 and the valve plate 58, it is possible to reduce the space in which the check valve CV is disposed, and it is possible to supply the hydraulic oil to the center position along the rotation axis X of the fluid supply pipe 54, which enables pressure loss to be further reduced.

OTHER EMBODIMENTS

In addition to the above-described embodiment, this disclosure may be configured as follows (the same reference numbers will be given to those having the same functions as those in the embodiment).

Figure 7:
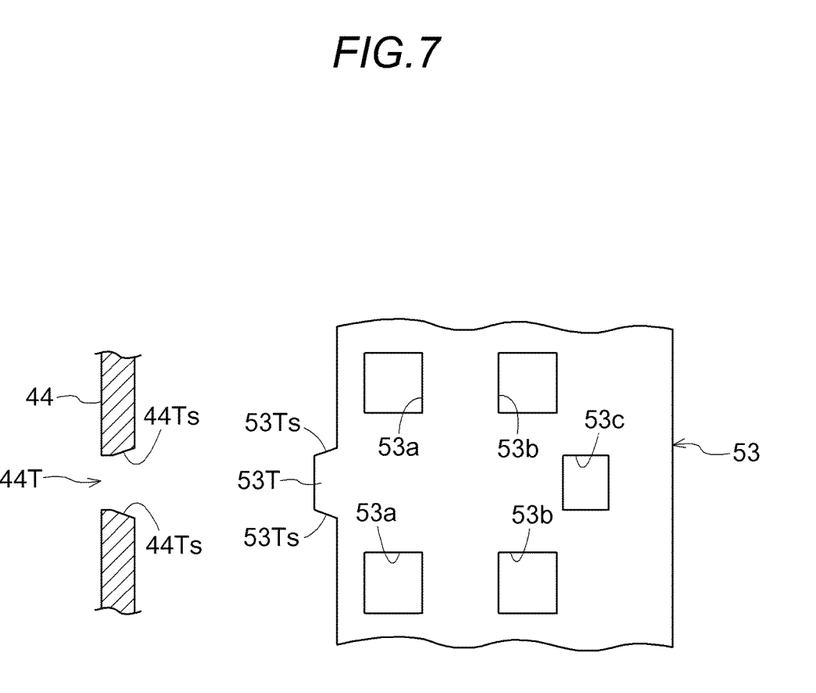
FIG. 7 is a view illustrating a configuration of other embodiments (a) and (b).

(a) As illustrated in FIG. 7, tapered surfaces 53Ts are formed on the opposite side surfaces in the width direction so that the width of the engagement protrusion 53T is reduced toward the tip end side thereof. By forming the tapered surfaces 53Ts in this way, when the sleeve 53 is fitted into the inner space 40R of the connecting bolt 40, the engagement between the engagement protrusion 53T and the engagement recess 44T may be easily performed.

(b) As illustrated in FIG. 7, introduction surfaces 44Ts may be formed by forming opening protrusions of the engagement recess 44T, which are formed in the regulation wall 44 as a wall portion, in a tapered shape. By forming the introduction surface 44Ts in this way, when the sleeve 53 is fitted into the inner space 40R of the connecting bolt 40, the engagement between the engagement protrusion 53T and the engagement recess 44T may be easily performed.

In addition, although FIG. 7 illustrates a configuration of another embodiment (a) and a configuration of still another embodiment (b), only one configuration may be implemented, and the respective configurations may be combined with each other as illustrated in FIG. 7.

(c) The number of engagement protrusions 53T formed on the sleeve 53 may be one, or may be three or more. In addition, the position of the engagement recess 44T, which is formed in the regulation wall 44 as a wall portion, is not necessary to overlap the drain groove D.

(d) The engagement portion T may be configured using an intermediate member such as a pin, which penetrates the connecting bolt 40 and the sleeve 53 in the radial direction.

(e) The engagement portion T includes an engagement groove, which is formed in a posture along the rotation axis X in the inner periphery of the connection bolt 40, and a protrusion formed on the outer periphery of the sleeve 53 to be engaged with the engagement groove. That is, the engagement portion T may be formed using the engagement structure formed between the inner peripheral surface of the connecting bolt 40 and the outer peripheral surface of the sleeve 53.

This disclosure may be used for a valve opening/closing timing control apparatus, which includes a driving side rotator and a driven side rotator and accommodates a valve unit in a connecting bolt, which interconnects the driven side rotator to the camshaft.

A feature of an aspect of this disclosure resides in that a valve opening/closing timing control apparatus includes: a driving side rotator configured to rotate synchronously with a crankshaft of an internal combustion engine; a driven side rotator disposed coaxially with a rotation axis of the driving side rotator and configured to rotate integrally with a valve opening/closing camshaft; a connecting bolt disposed coaxially with the rotation axis to connect the driven side rotator to the camshaft, and having an advanced angle port and a retarded angle port formed to extend from an outer peripheral surface to an inner space thereof, the advanced angle port and the retarded angle port communicating with an advanced angle chamber and a retarded angle chamber between the driving side rotator and the driven side rotator, respectively; and a valve unit disposed in the inner space of the connecting bolt, in which the valve unit includes a sleeve provided on an inner peripheral surface of the inner space of the connecting bolt, and having an advanced angle communication hole that communicates with the advanced angle port and a retarded angle communication hole that communicates with the retarded angle port, the advanced angle communication hole and the retarded angle communication hole are disposed in a same phase around the rotation axis, and an engagement portion is provided to determine relative postures of the sleeve and the connecting bolt in relation to the connecting bolt around the rotation axis, and the engagement portion is configured with an engagement recess formed by cutting out a wall portion that is formed in an annular shape in an inner periphery of the inner space and an engagement protrusion formed on an end portion of the sleeve.

With this configuration, by engaging the engagement protrusion formed on the end portion of the sleeve with the engagement recess formed by cutting out the wall portion, which is formed in an annular shape in the inner space of the connecting bolt, it is possible to appropriately set the postures of the sleeve and the connecting bolt around the rotation axis such that the advanced angle communication hole of the sleeve communicates with the advanced angle port of the connecting bolt and the retarded angle communication hole of the sleeve communicates with the retarded angle port of the connecting bolt.

Therefore, the valve opening/closing timing control apparatus may be configured to operate with good responsiveness without causing complication or enlargement of a flow path configuration while ensuring the efficient use of the sleeve.

As another configuration, the valve opening/closing timing control apparatus may further include: a fluid supply pipe accommodated coaxially with the rotation axis in the inner space and having a base end portion fitted into the inner space and a pipe passage portion having a diameter smaller than a diameter of the base end portion, the pipe passage portion having a supply port formed in an outer periphery of a tip end portion thereof; and a spool disposed to be slidable in a direction along the rotation axis in a state of being guided on an inner peripheral surface of the sleeve and an outer peripheral surface of the pipe passage portion of the fluid supply pipe and having a pair of land portions formed on an outer periphery thereof and an intermediate aperture formed at an intermediate position between the pair of land portions to deliver a fluid from an inside to an outside, in which the sleeve may further include a drain hole that discharges the fluid therethrough, the drain hole may be disposed in a different phase from the advanced angle communication hole and the retarded angle communication hole, and the connecting bolt may include a drain flow path formed in a groove shape in an inner peripheral surface thereof to deliver the fluid discharged from the drain hole to a head portion side of the connecting bolt.

With this configuration, since in the fluid supply pipe, the fluid is linearly sent along the rotation axis so as to be directly supplied from the supply port of the fluid supply pipe to the spool, pressure reduction due to pressure loss before the fluid is supplied to the advanced angle chamber or the retarded angle chamber is suppressed. In addition, in this configuration, it is not necessary to form a dedicated flow path for supplying a hydraulic oil to the spool in a groove shape or a hole shape in the connecting bolt. Moreover, since the fluid is discharged outward from the head portion side of the connecting bolt through the drain flow path formed in the groove shape in the connecting bolt, a flow path is simplified.

As another configuration, the wall portion may regulate a movement of the spool in a protruding direction and regulate an outward movement of the sleeve.

With this configuration, the wall portion regulates the movement of the spool in the protruding direction and regulates the outward movement of the sleeve, thereby determining the positions of the spool and the sleeve.

As another configuration, the engagement protrusion may be formed in a tapered shape, a width of which is reduced toward a tip end side.

With this configuration, in an operation of relatively moving the connecting bolt and the sleeve in the direction along the rotation axis when engaging the engagement protrusion with the engagement recess, it is possible to perform assembly with a high accuracy by which the tapered surface of the engagement protrusion comes into contact with an opening protrusion of the engagement recess, so that assembly can be easily performed.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A valve opening/closing timing control apparatus comprising:
    a driving side rotator configured to rotate synchronously with a crankshaft of an internal combustion engine;
    a driven side rotator disposed coaxially with a rotation axis of the driving side rotator and configured to rotate integrally with a valve opening/closing camshaft;
    a connecting bolt disposed coaxially with the rotation axis to connect the driven side rotator to the camshaft, and having an advanced angle port and a retarded angle port formed to extend from an outer peripheral surface to an inner space thereof, the advanced angle port and the retarded angle port communicating with an advanced angle chamber and a retarded angle chamber between the driving side rotator and the driven side rotator, respectively; and
    a valve unit disposed in the inner space of the connecting bolt,
    wherein the valve unit includes a sleeve provided on an inner peripheral surface of the inner space of the connecting bolt, and having an advanced angle communication hole that communicates with the advanced angle port and a retarded angle communication hole that communicates with the retarded angle port,
    the advanced angle communication hole and the retarded angle communication hole are disposed in a same phase around the rotation axis, and an engagement portion is provided to determine relative postures of the sleeve and the connecting bolt in relation to the connecting bolt around the rotation axis, and
    the engagement portion is configured with an engagement recess formed by cutting out a wall portion that is formed in an annular shape in an inner periphery of the inner space and an engagement protrusion formed on an end portion of the sleeve.

2. The valve opening/closing timing control apparatus according to claim 1, further comprising:
    a fluid supply pipe accommodated coaxially with the rotation axis in the inner space and having a base end portion fitted into the inner space and a pipe passage portion having a diameter smaller than a diameter of the base end portion, the pipe passage portion having a supply port formed in an outer periphery of a tip end portion thereof; and
    a spool disposed to be slidable in a direction along the rotation axis in a state of being guided on an inner peripheral surface of the sleeve and an outer peripheral surface of the pipe passage portion of the fluid supply pipe and having a pair of land portions formed on an outer periphery thereof and an intermediate aperture formed at an intermediate position between the pair of land portions to deliver a fluid from an inside to an outside,
    wherein the sleeve further includes a drain hole that discharges the fluid therethrough,
    the drain hole is disposed in a different phase from the advanced angle communication hole and the retarded angle communication hole, and
    the connecting bolt includes a drain flow path formed in a groove shape in an inner peripheral surface thereof to deliver the fluid discharged from the drain hole to a head portion side of the connecting bolt.

3. The valve opening/closing timing control apparatus according to claim 2,
    wherein the wall portion regulates a movement of the spool in a protruding direction and regulates an outward movement of the sleeve.

4. The valve opening/closing timing control apparatus according to claim 1,
    wherein the engagement protrusion is formed in a tapered shape, a width of which is reduced toward a tip end side.

* * * * *